(12) United States Patent
Yang et al.

(10) Patent No.: US 7,289,468 B2
(45) Date of Patent: Oct. 30, 2007

(54) SYSTEM AND METHOD FOR SCHEDULING PROTOCOL DATA UNITS

(75) Inventors: Jen-Shun Yang, Taoyuan (TW); Ray-Guang Cheng, Taoyuan (TW); Chien-Chao Tseng, Taoyuan (TW)

(73) Assignee: Benq Corporation, Taoyuan (TW)

( * ) Notice: Subject to any disclaimer, the term of this patent is extended or adjusted under 35 U.S.C. 154(b) by 948 days.

(21) Appl. No.: 10/388,891

(22) Filed: Mar. 14, 2003

(65) Prior Publication Data

US 2003/0185214 A1 Oct. 2, 2003

(30) Foreign Application Priority Data

Mar. 27, 2002 (TW) ................. 91106060 A (51) Int. Cl.
*H04Q 7/20* (2006.01)
(52) U.S. Cl. ................. 370/329; 370/336; 370/345
(58) Field of Classification Search ............... 370/329, 370/336, 345
See application file for complete search history.

(56) References Cited

U.S. PATENT DOCUMENTS 7,164,919 B2 * 1/2007 Chen .................. 455/452.2

2005/0201281 A1 * 9/2005 Damnjanovic et al. ..... 370/230

* cited by examiner

*Primary Examiner*—Melvin Marcelo
(74) *Attorney, Agent, or Firm*—Birch, Stewart, Kolasch & Birch, LLP (57) ABSTRACT

The present invention relates to a scheduling unit in a wireless communication system. For sequentially receiving a plurality of Protocol Data Units (PDUs) in a plurality of communication sessions, accumulate and schedule the plurality of PDUs during a predetermined time frame, and transmit the PDUs based on a maximum power-strength of the wireless communication system. The scheduling unit comprises a time-based scheduler and a power-based scheduler. When the power-based scheduler schedules the PDUs, if the total sum of the required power of the PDUs exceeds the maximum power-strength of the wireless communication system, the power-based scheduler sends back to the time-based scheduler the PDUs whose power amounts to the exceeding of the maximum power-strength of the wireless communication system according to the corresponding priority values of the PDUs, so that the wireless communication system transmits all at a time the remaining PDUs whose total power remains within the maximum power-strength.

38 Claims, 8 Drawing Sheets

SYSTEM AND METHOD FOR SCHEDULING PROTOCOL DATA UNITS

FIELD OF THE INVENTION

The present invention relates to a method for scheduling and transmitting protocol data units (PDUs), and more particularly, to a method for scheduling and selectively transmitting the PDUs in the downlink direction in a code division multiple access (CDMA) wireless communication system.

BACKGROUND OF THE INVENTION

The quality of service (QoS) for wireless communication needs to be improved. Measurements for the QoS include average service rate, packet loss and error rate, packet delay bound . . . etc. The average service rate means the average transmitting rate of the communication data in the communication sessions. The packet loss and error rate means the maximum allowable error rate of the communication data in the communication sessions by bits. The packet delay bound means the maximum allowable time of communication data in communication sessions based on the PDUs.

For wireless communication, data in the communication session, also called PDUs, are transmitted in a packet form in a fixed bandwidth or band frequency. The QoS depends on how to allocate the data of communication sessions from each mobile communication devices in a limited bandwidth. For example, the QoS can be adjusted by reducing the transmission energy but keeping the energy above the requirement. Adjusting energy is a common way to allocate resources.

In a CDMA communication system, the interference has greater influence on the signal than the noise does. Therefore, the signal-to-interference rate (SIR) is used as a measurement for QoS in a CDMA communication system. For providing more communication session in a limited bandwidth, the best situation is to have the minimum SIR for each data of the communication session. The minimum SIR can guarantee the acceptable packet loss and error rate.

The power-strengths of each communication sessions are different depending on positioning of the mobile communication devices and packet error rate. The quality of service can be enhanced by increasing the power-strength or decreasing the service rate of some communication sessions. However, increasing the power-strength of the communication session may lead to additional interference to other communication sessions. Also, decreasing in service rate may delay the communication session for the mobile communication device.

Considering the loading of the base station, it is commonly to use time-based or power-based solutions to arrange and schedule the transmit of PDUs. The time-based scheduler or power-based scheduler according to the prior art has the conception of scheduling but lacks proper allocation. For example, a general time-based scheduler schedules according to the orders and the required QoS of the communication session, and has nothing to do with power resources allocation. A general power-based scheduler adjusts the power of communication session for a fixed QoS. This means that the prior art only deals the problem of constant bit rate (CBR), not the variable bit rate (VBR).

However, the present invention provides a system or method for classifying the power-strength for communication sessions to schedule and transmit based on the priority sequence in the downlink direction from base stations to mobile communication devices in wireless communication system. This invention is suitable to the systems of CBR and VBR for solving the problem of the prior art.

SUMMARY OF THE INVENTION

It is therefore a primary objective of the present invention to provide a system and a method for classifying the PDUs by the PCPS (Power-strength Classified Packet Scheduling) scheme and for scheduling and selectively transmitting the PDUs by the required power-strength of the communication session of the CDMA wireless communication system in the downlink direction.

In a preferred embodiment, the present invention provides a scheduling unit comprising a bandwidth adjuster, a time-based scheduler, and a power-based scheduler. The bandwidth adjuster classifies the PS-classes according to each position of mobile communication devices and the connection power of base stations in the communication-covered range of the wireless communication system. The bandwidth adjuster also allots the corresponding bandwidth ratio according to a plurality of PS-classes and different qualities of service. The time-based scheduler schedules a plurality of PDUs according to the data provided by the bandwidth adjuster.

In every predetermined time frame, time-based scheduler respectively accumulates and temporarily stores a plurality of PDUs. The priority value of the PDUs is assigned based upon the desired quality of service of the communication session and information of the PS-classes. The time-based scheduler schedules a plurality of PDUs based on the priority value of PDUs of communication sessions, and transmits to the power-based scheduler.

Then the power-based scheduler schedules the plurality of PDUs from the time-based scheduler based on the maximum power-strength of wireless communication system and the desired power of communication session for PDUs, and transmits the PDUs based on the allocated power schedule. The power-based scheduler sends back to the time-based scheduler the PDUs whose power amounts to the exceeding of the maximum power-strength of the wireless communication system It is an advantage of the present invention that the scheduling unit effectively utilizes the limited power resources of wireless communication system, and assigns the transmission of each communication session most effectively via the scheduling process of the scheduling unit in accordance with the present invention in communication sessions. This invention enhances the quality of service and provides a higher average service rate, and a lower packet loss and error rate and a lower packet delay bound.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE APPENDED DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
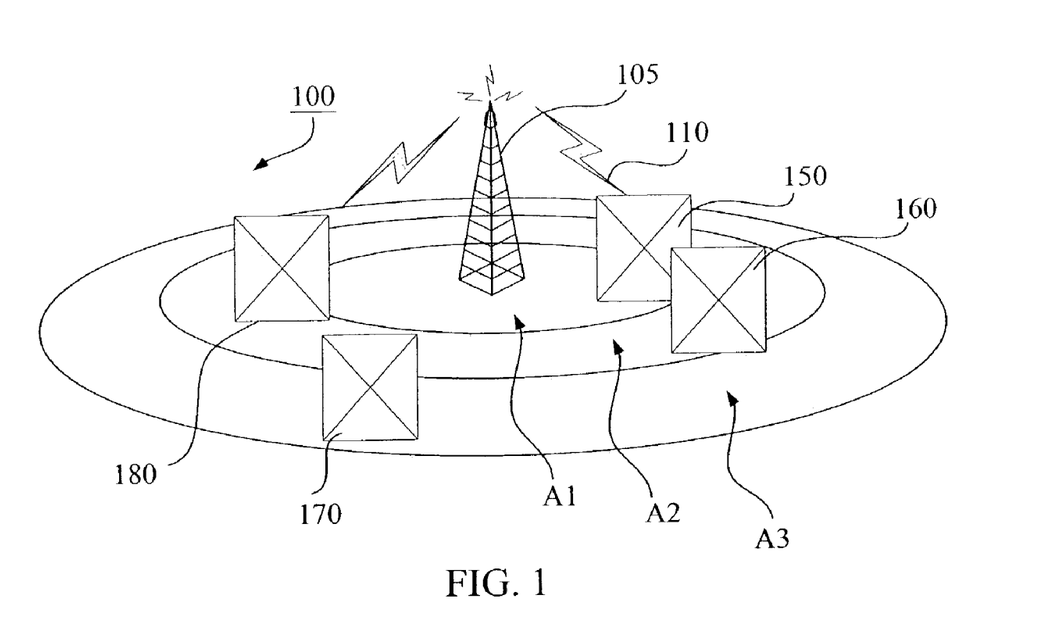
FIG. 1 is a schematic diagram of a wireless communication system with Power-Strength classes according to present invention.

Please refer to FIG. 1. FIG. 1 is a schematic diagram of a wireless communication system 100 with Power-Strength (PS) classes A1, A2, and A3 according to the present invention. The communication-covered range of the wireless communication 100 comprises three PS-classes A1, A2, and A3. The wireless communication 100 comprises a base station 105 and mobile communication devices 150, 160, 170, and 180 located in different PS-classes A1, A2, and A3. Each of the mobile communication devices 150, 160, 170, and 180 transmits or receives its corresponding communication session 110 to or from the base station 105. Each communication session 110 comprises a plurality of PDUs. FIG. 1 is an ideal condition without influence from shelters and multipaths. Under the ideal condition, each of communication sessions is transmitted directly between the base station 105 and each mobile communication devices. Under the ideal condition, if the mobile communication device was close to the base station 105, the system 100 can reduce the power or enlarge the service rate but still keeps the same QoS.

Figure 2:
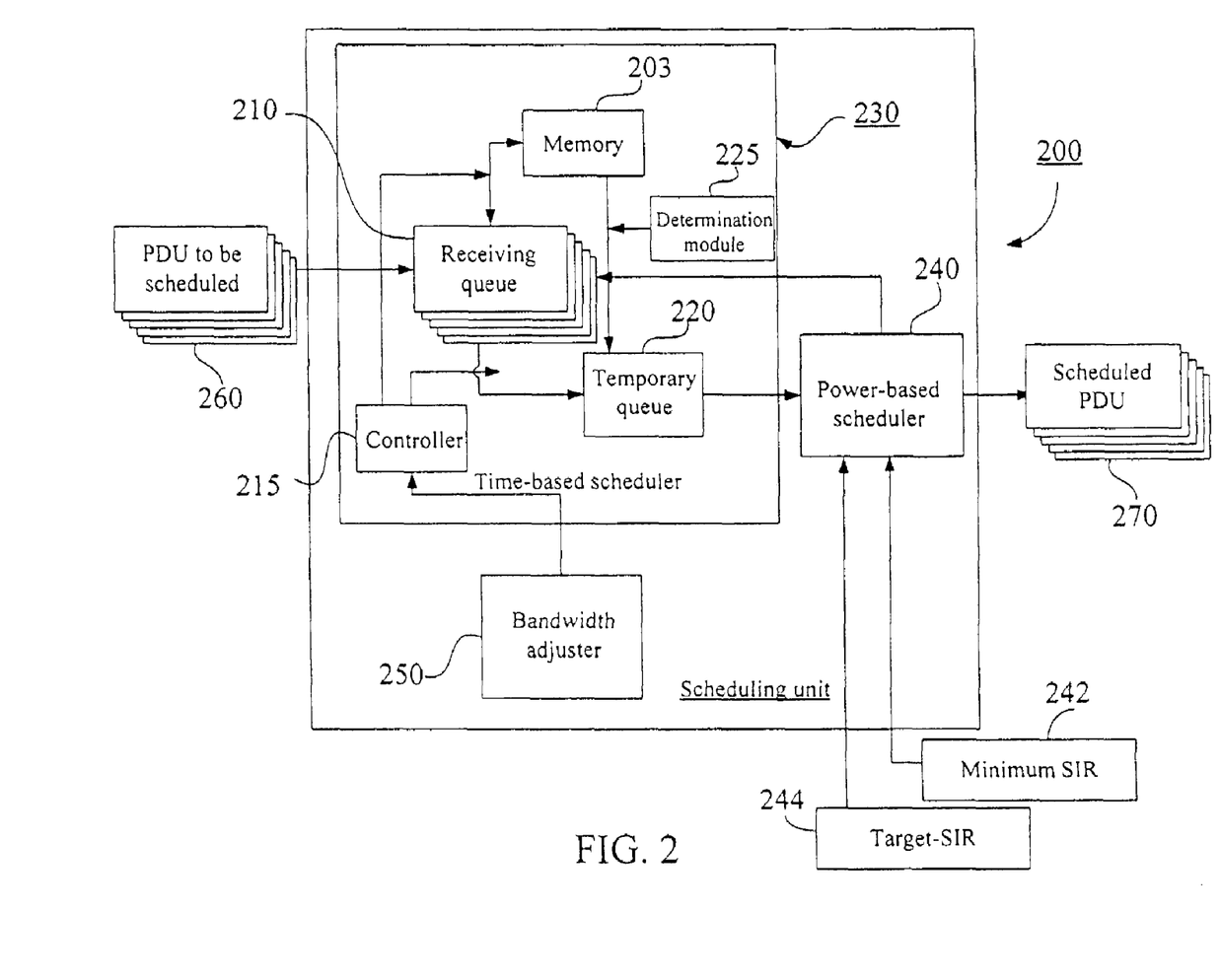
FIG. 2 is a function block diagram of a scheduling unit according to the present invention.

Please refer to FIG. 2. FIG. 2 is a function block diagram of a scheduling unit 200 according to the present invention. The present invention provides a scheduling unit 200 used in the base station 105 of the wireless communication system 100. The scheduling unit 200 comprises a bandwidth adjuster 250, a time-based scheduler 230, and a power-based scheduler 240. The time-based scheduler 230 comprises a memory 203, a receiving queue 210, a controller 215, and a temporary queue 220, and a determination module 225. A communication session comprises PDUs to be scheduled 260, and scheduled PDUs 270. The scheduling queue 210 temporarily stores PDUs to be scheduled 260 in the communication session for further processing. The controller 215 assigns the priority values of the PDUs to be scheduled 260 in the receiving queue 210, and controls the transmission of the PDUs to be scheduled 260. The temporary queue 220 temporarily stores the PDUs to be scheduled 260, which have been scheduled and could be transmitted to a power-based scheduler within the allowable service rate. The memory 203 stores the PDUs in one communication session. The PDUs to be scheduled 260 is the maximum allowable number in the communication session that is capable of processing in a predetermined time frame.

The bandwidth adjuster 250 is used for classifying the PS-classes A1, A2, and A3 in the communication-covered range of the wireless communication system 100 according to the power of the communication session 110 transmitted to the base station 105 by wireless communication devices 150, 160, 170, and 180. The bandwidth adjuster 250 also assigns the scheduling priority of PS-class of each predetermined time frame in 100 predetermined time frames.

The bandwidth adjuster 250 confirms the PS-classes A1, A2, and A3 for the communication sessions 110 in the communication-covered range. The bandwidth adjuster 250 allots the corresponding bandwidth ratios to different PS-classes A1, A2, and A3 according to the sum of the service rate of the communication session 110. The time-based scheduler 230 schedules the PDUs to be scheduled 260 of the communication sessions 110 in the corresponding PS-classes A1, A2, and A3 according to the scheduling priority of the PS-classes and the bandwidth ratios. The bandwidth adjuster 250 assigns the priority of the PS-classes A1, A2 and A3 according to the desired quality of service of the communication sessions 110 to retain the bandwidth resources.

Figure 3:
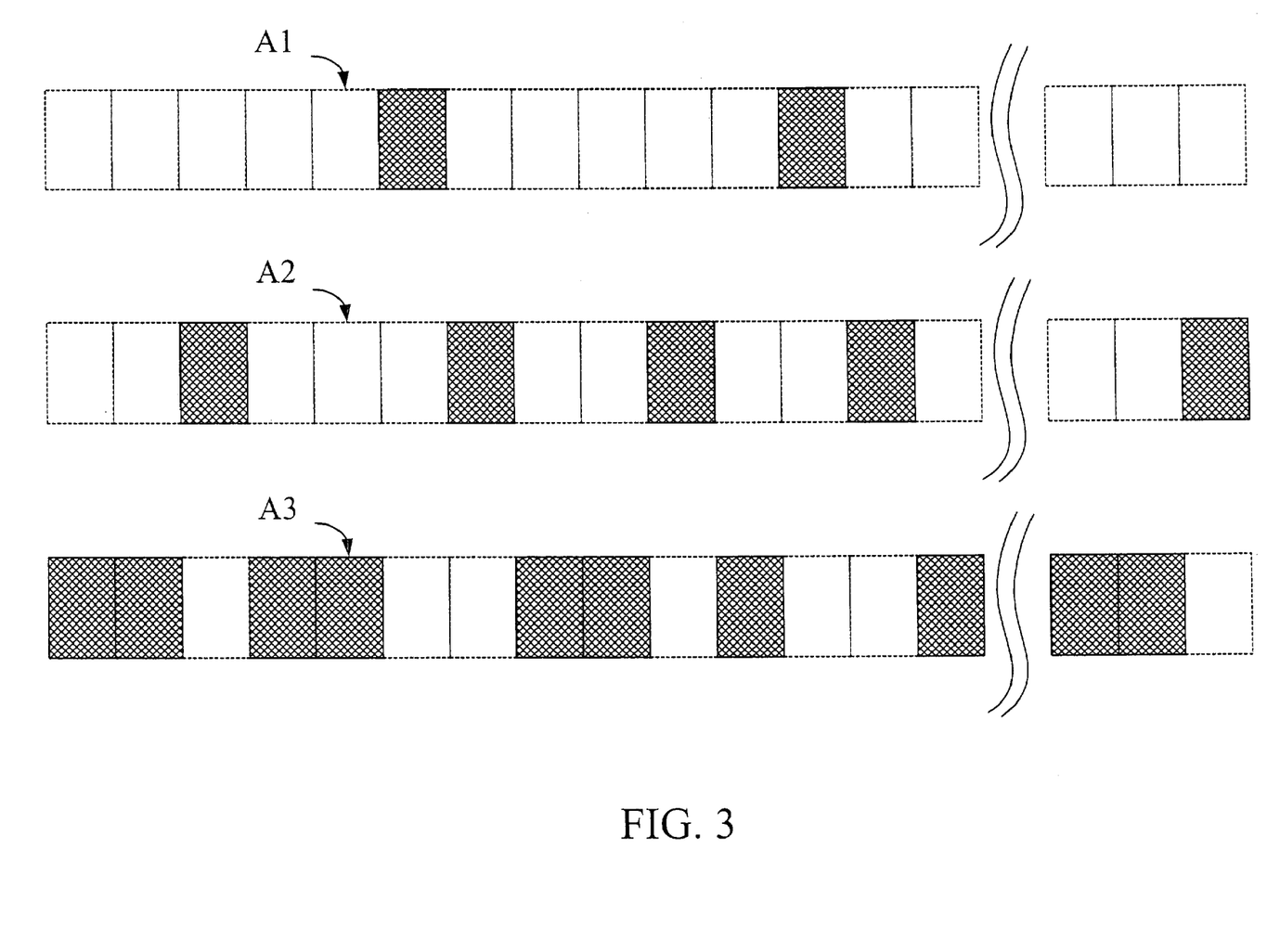
FIG. 3 is a schematic diagram showing scheduling the highest priority in the predetermined time frame of different PS-classes shown in FIG. 1.

Please refer to FIG. 3. FIG. 3 is a schematic diagram showing scheduling the highest priority in the predetermined time frame of different PS-classes A1~A3 shown in FIG. 1. In FIG. 3, the grids show the predetermined time frames per transmission second. There are a hundred predetermined time frames transmitted in a second. The grids aligning between two dash lines in FIG. 3 are used to explain the predetermined time frames at the same time. Within the three grids at the same time, the dark grid has the high priority. In other words, the bandwidth adjuster 250 chooses only one predetermined time frame (the dark one) entering into the time-based scheduler 230. There may be one or a plurality of communication sessions, or no communication sessions in each of the predetermined time frames.

In each predetermined time frame, the time-based scheduler 230 deals the communication session 110 according to the PS-classes A1, A2, and A3 assigned by the bandwidth adjuster 250. The plurality of the receiving queues 210 individually accumulate the plurality of the PDUs to be scheduled 260 of the communication session 110. After a predetermined time frame period, the PDUs to be scheduled 260 accumulated in each receiving queue 210 will be scheduled by the time-based scheduler 230 according to the received time sequence. The priority value of the earlier received PDU is larger than the priority value of the later received PDU. Following this principle, the controller 215 assigns the corresponding priority value of each PDU to be scheduled 260.

Figure 4:
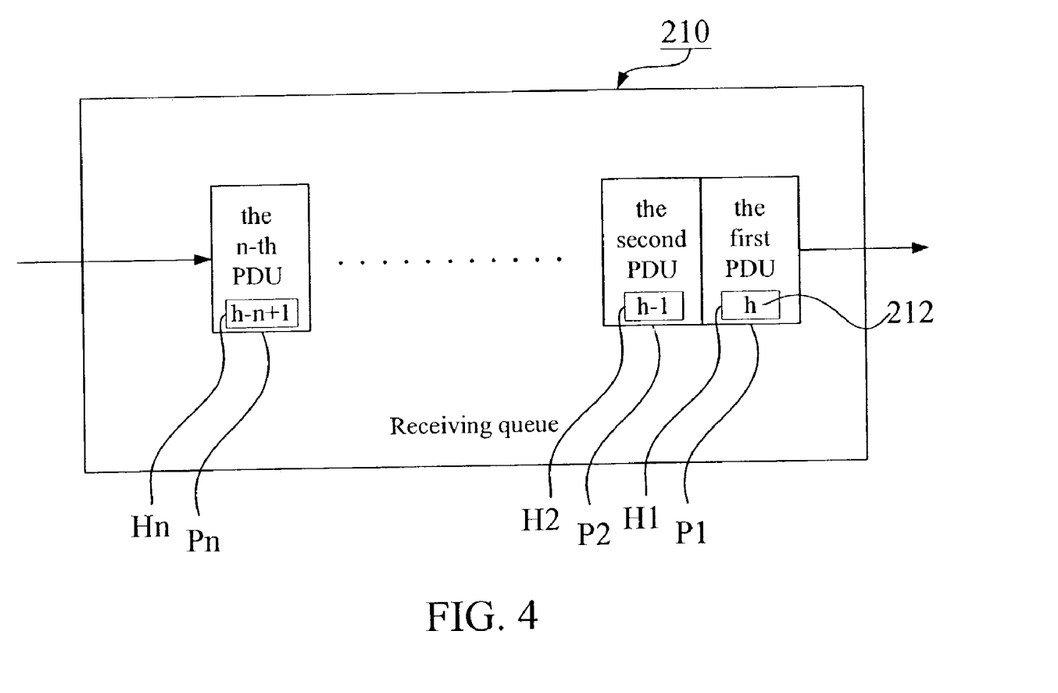
FIG. 4 is a schematic diagram showing the priority values of the PDUs in the receiving queue 210 shown in FIG. 2.

Please refer to FIG. 4. FIG. 4 is a schematic diagram showing the priority values of the PDUs in the receiving queue 210 shown in. FIG. 2. When there is not any PDU in the receiving queue 210, the controller 215 assigns the priority value H1 of the first received PDU P1 as the maximum allowable number, and further assigns the priority values H2~Hn of the remaining received PDUs P2~Pn in a descending order by 1. As showed in FIG. 4, the priority value H1 of the first PDU P1 is a constant number h. The second priority value H2 of the second PDU P2 is h−1. The priority values H1~Hn of the plurality of PDUs P1~Pn in the receiving queue 210 may be greater, smaller than or equal to zero. Then, transmit the PDUs with the priority value H1~Hn larger than zero from large to small.

Figure 5:
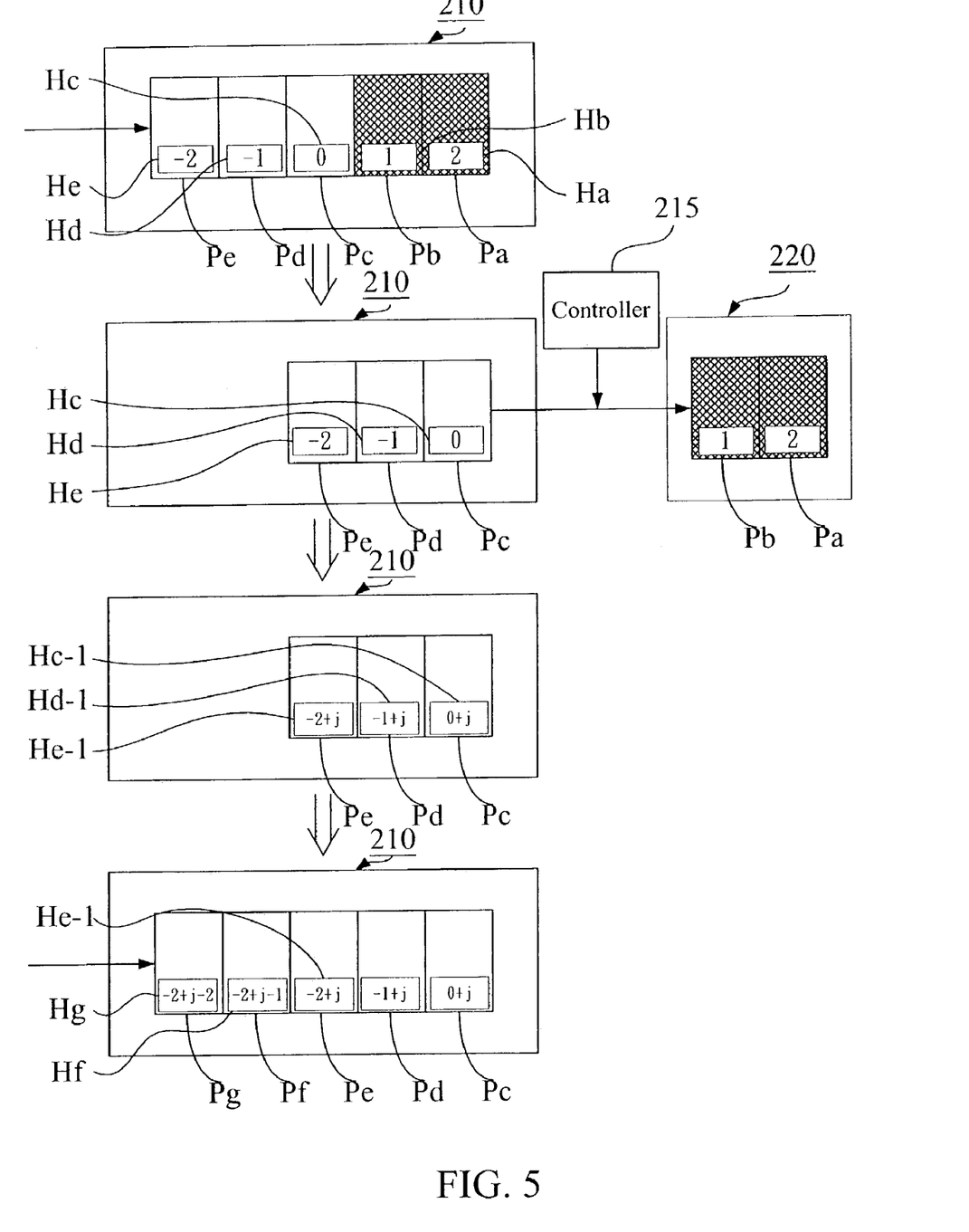
FIG. 5 is a block diagram of the controller in the time based scheduler transmitting the PDUs in the receiving queue shown in FIG. 2.

Please refer to FIG. 5. FIG. 5 is a block diagram of the controller 215 in the time based scheduler 230 transmitting the PDUs Pa, Pb, Pc, Pd, and Pe in the receiving queue 210 shown in FIG. 2. The priority values Ha and Hb for PDUs Pa and Pb are 2 and 1, respectively. The priority values He, Hd, and He for PDUs Pc, Pd, and Pe are 0, −1, and −2, respectively. The controller 215 transmits the PDUs with values at 1 and 2 from the receiving queue 210 to the temporary queue 220 for further transmitting to the power-based scheduler 240. Hence, the controller 215 transmits PDUs Ha and Hb. As to the PDUs Pc, Pd, and Pe with non-positive values, the controller 215 updates their priority values Hc, Hd, and He to become Hc−1, Hd−1, and He−1, respectively, by adding the additional maximum allowable number. And then, the PDUs Pc, Pd, and Pe will be scheduled together with the subsequent PDUs Pf and Pg in the next predetermined time frame.

In, FIG. 5, j represents the additional maximum allowable number, the updated priority values Hc−1, Hd−1, and He−1 are 0+j, −1+j, and −2+j, respectively. For the received PDUs Pf and Pg, the controller 215 assigns their priority values starting from the succession to the minimum value, He−1, in a descending order by 1. Therefore, the priority values for PDUs Pf and Pg are −2+j−1 and −2+j−2, respectively.

The PDUs with positive priority values are allowed to be transmitted to the power-based scheduler 240 under the predetermined service rate. The PDUs with non-positive priority values are transmitted above the predetermined service rate and be received in advance by the power-based scheduler.

In particular, the time-based scheduler 230 transmits the PDUs to be scheduled 260 to the temporary queue 220 via the controller 215 according to the scheduling priority of PS-classes assigned by the bandwidth adjuster 250. When the controller 215 transmits the PDUs to be scheduled 260,s the PDUs to be scheduled 260 in the communication sessions 110 of a PS-class need to be transmitted at the same time. The controller 215 compares the priority values of the ahead PDUs Pa in the plurality of receiving queues 210, and sequentially transmits those PDUs to the common temporary queue 220 from large to small. If there are two or more than two receiving queues 210 that have the same priority value Ha for the ahead PDUs Pa, the round robin method is used for transmitting. The controller 215 repeats the above-mentioned steps until all PDUs to be scheduled 260 with positive priority values are transmitted to the common temporary queue 220.

There are two levels for scheduling the PDUs to be scheduled 260 in the temporary queue 220. First is based on the priority of the PS-classes A1, A2 and A3 in each predetermined time frame. Second is based in the priority values in the same PS-class.

In the scheduling unit 200 as shown in FIG. 2, the memory 203 further stores a plurality of waiting bounds corresponding to the plurality of communication sessions. The waiting bound represents the longest time period that any PDU of the corresponding communication session 110 is allowed to stay in the time-based scheduler 230 and still remains valid. Each PDU received by the time-based scheduler 230 has a corresponding aging time value representing the accumulated time period that the PDU has entered into the time-based scheduler 230.

As shown in FIG. 2, before each PDU is transmitted from the common temporary queue 220 to the power-based scheduler 240, the determination module 225 determines whether the PDU is still valid by comparing the aging time value of the PDU with the corresponding waiting bound. If the aging time value of the PDU is not larger than the corresponding waiting bound, the PDU is transmitted to the power-based scheduler. If the aging time value of the PDU is larger than the corresponding waiting bound, the PDU may be abandoned or transmitted directly to the power-based scheduler 240 according to the previously defined data characters of the communication session 110. In other words, it is dependent on the importance of the previously defined data characters to determine either to abandon or to compulsively transmit the PDUs to the power-based scheduler 240.

The following description explains the waiting bound mentioned above. The memory 203 further stores a plurality of service weights and a plurality of service intervals of the PS-classes corresponding to the plurality of communication sessions 110. Each service weight is the ratio of the service rate of the corresponding communication session 110 to the sum of all the service rates of the communication sessions 110 in the PS-classes A1, A2, and A3. Each service interval of the PS-class is a time interval that the time-based scheduler 230 schedules the PS-classes A1, A2, and A3 of the corresponding communication session 110. As showed in FIG. 3, the service interval of the PS-class is an interval between the dark grids, which means between the two adjacent predetermined time frames with high priority in the same PS-class. Each PS-classes A1, A2, or A3 must be assigned at least once as the highest priority in each assigned service interval of the PS-class. On the other hand, each waiting bound of the corresponding communication session 110 is the ratio of the service interval of the PS-class to the service weight of the corresponding communication session 110. The algorithm is explained as the followings:

waiting_bound=(PSI/service_weight), where PSI means the service interval of the PS-class.

In the time-based scheduler 230, the PDUs of the communication session 110 comprise a plurality of bits. Each priority value of the PDU is assigned based on the desired quality of service of the communication session 110. The quality of service is further determined by an average service rate, a packet loss and error rate, and a packet delay bound. The priority value of the PDUs with high quality of service is larger than the priority value of the PDUs with low quality of service. The PDU with high quality of service means that the corresponding communication session 110 has a higher average service rate, a lower packet loss and error rate, and a lower packet delay bound. On the contrary, the PDU with low quality of service means that the corresponding communication session 110 has a lower average service rate, a higher packer loss and error rate, and a higher packet delay bound.

The power-based scheduler 240 schedules and transmits the PDUs from the time-based scheduler 230 according to the maximum power-strength of the wireless communication system 100. The minimum signal-to-interference ratio (minSIR) and the target-SIR must be previously provided to the power-based scheduler 240 for scheduling. The minSIR means the minimum required power-strength for the PDU when the base station 105 communicates with the mobile communication devices 150, 160, and 170 in the communication session 110. The minSIR is predetermined by the base station 105. The target-SIR is determined by the data error rate received by the mobile communication devices 150, 160, and 170.

When the power-based scheduler 240 schedules the plurality of PDUs, if the total sum of the required power of the plurality of PDUs exceeds the maximum power-strength of the wireless communication system 100, the power-based scheduler 240 sends back sequentially to the time-based scheduler 230 the PDUs whose power amounts to the exceeding of the maximum power-strength of the wireless communication system 100 according to the corresponding priority values 262 of the PDUs in an order from small to large, so that the wireless communication system 100 transmits all the remaining scheduled PDUs 270 whose total power being within the maximum power-strength at a time. The time-based scheduler 230 raises priority values for the returned PDUs from the power-based scheduler 240, and schedules those PDUs together with the PDUs to be scheduled 260 received in the next predetermined time frame.

The timed-based scheduler 240 can be further described as the following algorithm. A time-based scheduler sequentially schedules the PDUs according to the priority determined by a bandwidth adjuster of the PDUs. C represents the PS-class. K represents the communication session of the plurality of communication sessions PS-class in each PS-class. Hence, the time-based scheduler schedules P PDUs of the communication session K in PS-class C. Define the communication session K as the maximum allowable number $INC_k$ [C], the priority value of the PDU i ($i \leq p$) as $a_{i,k}$, the quantity of PDUs in a receiving queue as $Q_k$ [C], the aging time value of PDU i as $Aging\_times_{i,k}$, and the waiting bound of PDUs as $Waiting\_bound_k[p]$. A scheduling weight $\Psi_{i,k}$ determines the valid scheduling weight of PDU i for determining whether the PDU i is transmitted to a power-based scheduler or not. The algorithm is as the following description:

If the communication session K has not been stored into the receiving queue of scheduling units, it means $Q_k$ [C]=0, and $a_{i,k}=INC_k$ [C].

If $Q_k[C] \neq 0$, $a_{i,k}=a_{i-1,k}-1$.

As the above algorithm, each PDUs corresponds to different $a_{p,k}$. The largest $a_{p,k}$ is $INC_k[C]$, and the rest are in a descending order. If $a_{i,k}>0$, store the corresponding PDUs in a common temporary queue. If $a_{i,k}<=0$, each PDU added add $INC_k$ [C] to each of the $a_{i,k}$ (<=0) and retain each of the corresponding PDUs in the original receiving queue. The PDUs retained will be scheduled together with the received PDUs in the next predetermined time frame.

In particular, each communication session sequentially operates the corresponding algorithm based on the priority of PS-class, and temporarily stores the PDUs with its the priority value, $a_{i,k}>0$ in a common temporary queue. Each PDU in the common temporary queue is scheduled by the following algorithm:

$\Psi_{i,k}=a_{i,k}/(Waiting\_bound_k[p]-Aging\_times_{i,k})$

The PDUs with $\Psi_{i,k}>0$ are transmitted to the power-based scheduler sequentially. The PDUs with $\Psi_{i,k}<=0$ is abandoned or transmitted to the power-based scheduler according to the previously defined data characters of communication session. In other words, it is dependent on the importance of the data that have been previously defined for determining to abandon or transmit to power-based scheduler 240.

The procedure of the power-based scheduler can be described by another algorithm. The power-based scheduler receives m PDUs from a time-based scheduler. The m PDUs comes from n different communication sessions, and m≧N. The PS-class of the communication session K is C. Define the maximum allowable number $INC_k$ [C] and the priority value of PDU j ($j \leq m$) is $a_{j,k}$. Power index $g_k$ is a power index representing the communication session K. The power index determines the power level of the communication session. In fact, the service rate $R_k$ of the communication session K is equal to the result that the bit numbers of a PDU multiplies the maximum allowable number. The value of the frequency band bandwidth W is pre-defined by the wireless communication system. The target-SIR $r_k$ of the communication session K determines the error rate of the communication session. The target-SIR in the equation must be larger than the minSIR. The power index can be described as the following formula:

$$g_k = \frac{r_k}{r_k + (W/R_k)}$$

If $$\sum_{k=1}^{N} g_k \leq 0,$$

transmit the m PDUs to wireless communication hardware for transmitting.

If $$\sum_{k=1}^{N} g_k > 0,$$

sends back sequentially the PDUs to the time-based scheduler from small to large according to the original priority values of the PDUs in the common temporary queue until the remained PDUs can conform $$\sum_{k=1}^{N} g_k \leq 0.$$

If $$\sum_{k=1}^{N} g_k \leq 0,$$

the remained PDUs which are still in the power-based scheduler are transmitted to wireless communication hardware for transmitting.

Each priority value $a_{j,k}$ of the PDUs sent back to the time-based scheduler is updated by adding $INC_k$ [C], and then the aforementioned PDUs are scheduled with the received PDUs in the next predetermined time frame together.

Figure 6:
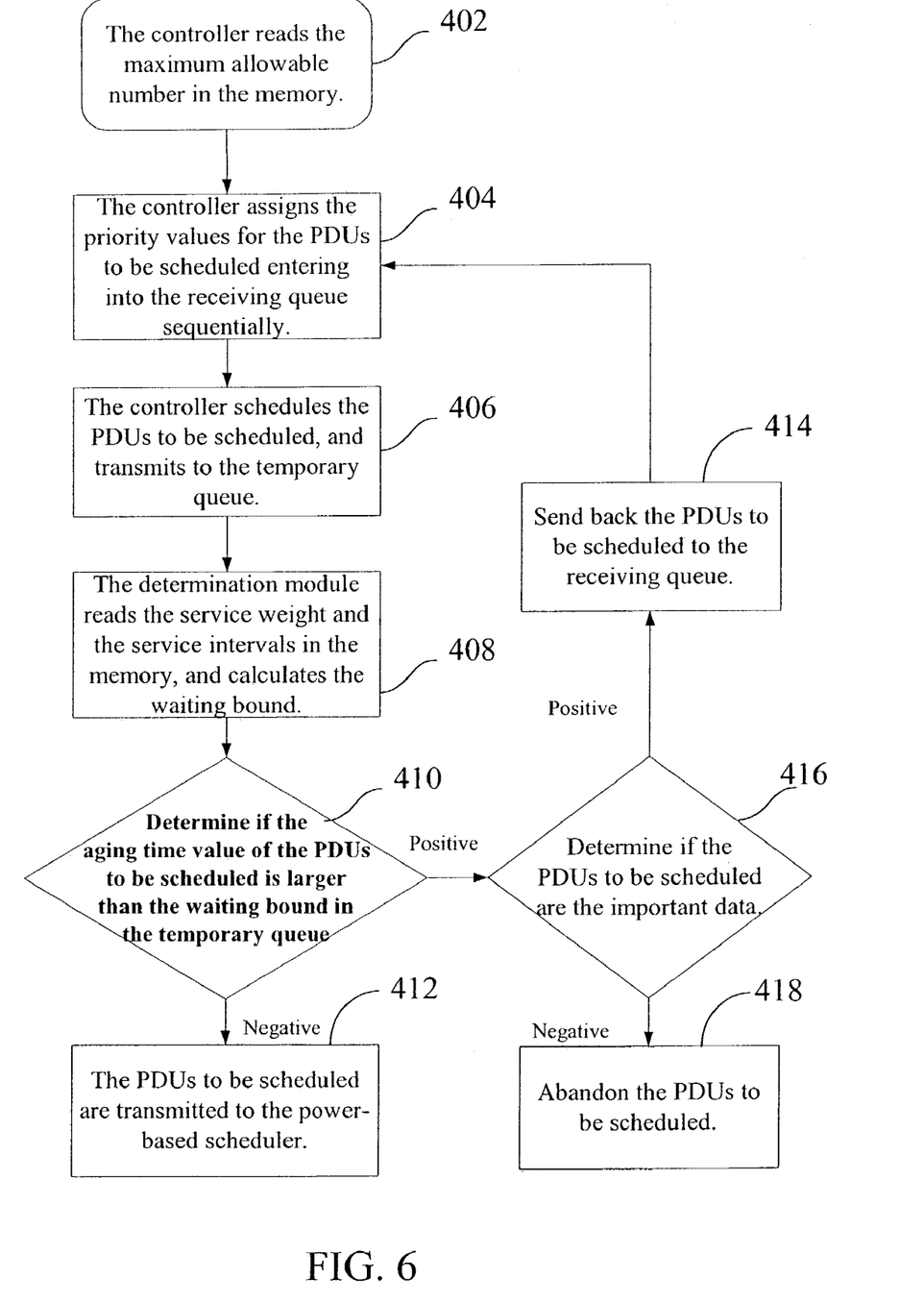
FIG. 6 is a flow chart of the method for scheduling and transmitting the PDUs to the power-based scheduler by the time-based scheduler shown in FIG. 2

Please refer to FIG. 6. FIG. 6 is a flow chart of the method for scheduling and transmitting the PDUs to the power-based scheduler 240 by the time-based scheduler 230 shown in FIG. 2. In the time-based scheduler 230, the steps for scheduling and transmitting the PDUs can be simplified as followings:

Step 402: the controller 215 reads the maximum allowable number in the memory 203.

Step 404: the controller 215 assigns the priority values for the PDUs to be scheduled 260 entering into the receiving queue 210 sequentially. The maximum priority value can't exceed the maximum allowable number. At this time, the aging time value of the PDUs to be scheduled 260 is increased with the time of entering the scheduling unit.

Step 406: the controller 215 schedules the PDUs to be scheduled 260 based on the priority values of the PDUs to be scheduled 260, and transmits the scheduled PDUs to be scheduled 260 to the temporary queue 220.

Step 408: the determination module 225 reads the service weight and the service intervals of the PS-class in the memory 203.

Step 410; the determination module 225 determines whether the aging time value of the PDUs to be scheduled 260 is more than the waiting bound in the temporary queue 220. If yes, go to step 416; if not go to step 412.

Step 416: determine whether the PDUs to be scheduled 260 are the important data. If yes, go to step 414; if not, go to step 418.

Step 414: send back the PDUs to be scheduled 260 to the receiving queue 210, and then go back to step 404.

Step 418: abandon the PDUs to be scheduled 260.

Step 419: stop.

Step 412: transmit the PDUs to be scheduled 260 of the temporary queue 220 to the power-based scheduled 240.

The second embodiment of the present invention is the method of scheduling and transmitting a plurality of PDUs. The invention provides a scheduling unit in a wireless communication system. The scheduling unit deals with the plurality of PDUs in the downlink direction from a base station. The scheduling unit schedules and transmits the PDUs according to the maximum power-strength of a wireless communication system. The scheduling unit comprises a bandwidth adjuster, a time-based scheduler, and a power-based scheduler.

At first, in the communication-covered range of the wireless communication system, the bandwidth adjuster classifies several PS-classes according to the distance between the base station and the originated positions of a communication session transmitted by each mobile communication device. The bandwidth adjuster also assigns a constant number of time frame per second. For example, the bandwidth adjuster assigns the priority of the PS-classes in 100 time frames. Also, the bandwidth adjuster identifies the PS-classes of the plurality of the communication sessions in the communication-covered range. The bandwidth adjuster allots the corresponding bandwidth ratio to different PS-classes according to a sum of total service rates of the plurality of communication sessions. In every predetermined time frame, the time-based scheduler accumulates and temporarily stores the plurality of PDUs of communication sessions. The priority value of each PDU is assigned based on the desired quality of service of the communication session. After that, the time-based scheduler schedules each PS-class based on the priority of PS-classes. The time-based scheduler schedules according to the priority values of the PDUs in the communication sessions, and transmits to the power-based scheduler among different communication sessions sequentially. At the end, the power-based scheduler schedules the PDUs based on the maximum power-strength of the wireless communication system, and the required power in communication sessions. If the total sum of the required power exceeds the maximum power-strength of the wireless communication system, the power-based scheduler sends back the PDUs sequentially to the time-based scheduler, and transmits all at a time the remaining PDUs whose total power remains within the maximum power-strength.

If the total sum of the required power of the plurality of PDUs exceeds the maximum power-strength of the wireless communication system as the power-based scheduler schedules the plurality of PDUs, the power-based scheduler sends back to the time-based scheduler the PDUs whose power amounts to the exceeding of the maximum power-strength according to the corresponding priority values of the PDUs, so that the wireless communication system transmits all at a time the remaining PDUs whose total power remains within the maximum power-strength. The time-based scheduler raises the priority values of the PDUs, and schedules the returned PDUs from the power-based scheduler with the. PDUs received in the next predetermined time frame together.

Figure 7:
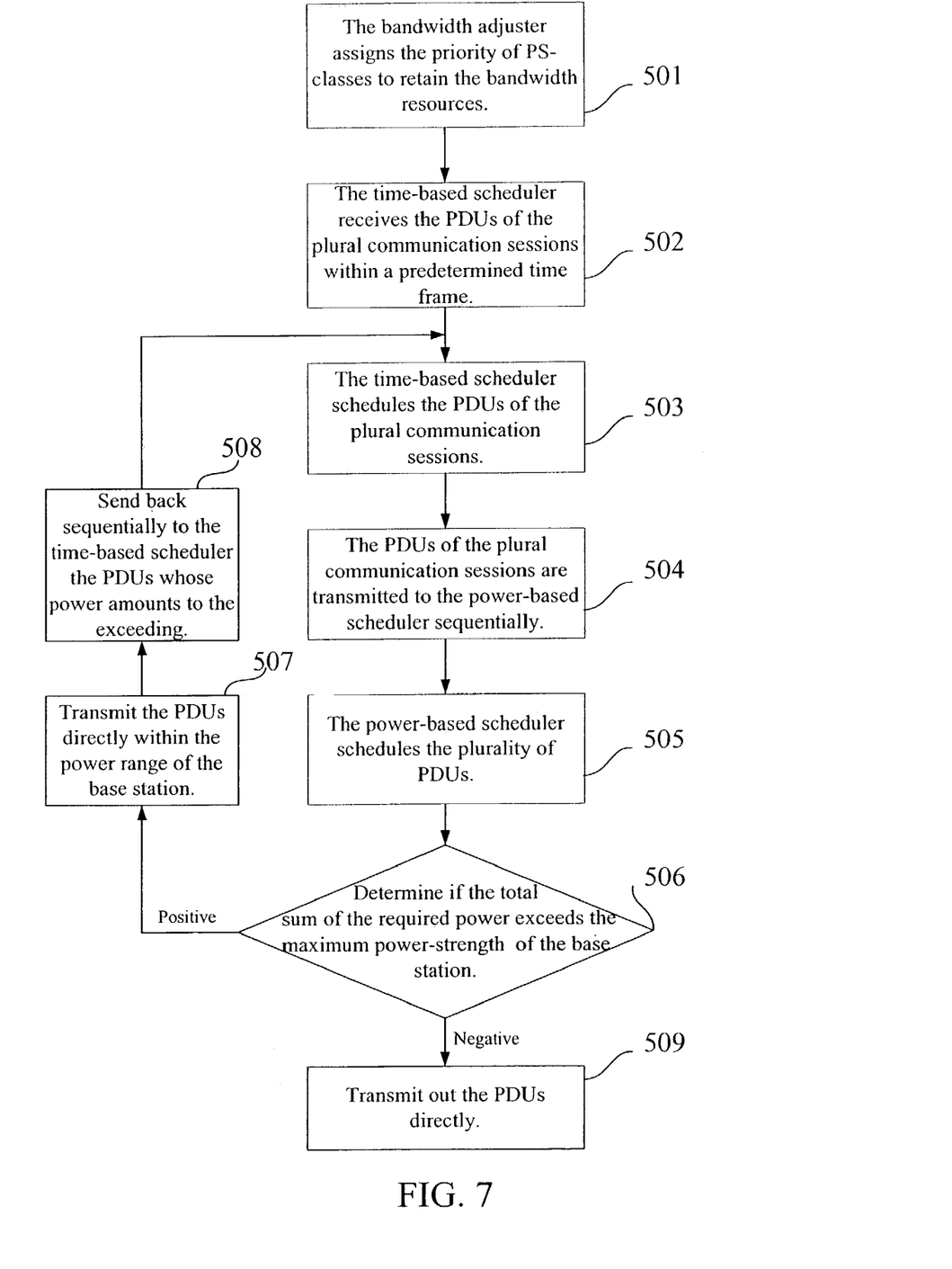
FIG. 7 is a flow chart of the method for scheduling PDUs according to the second embodiment of the present invention.

Please refer to FIG. 7. FIG. 7 is a flow chart of the method for scheduling PDUs according to the second embodiment of present invention. The scheduling method comprises the following steps:

Step 501: the bandwidth adjuster assigns the priority of PS-classes to retain the bandwidth resources.

Step 502: the time-based scheduler receives the PDUs of the plurality of communication sessions within a predetermined time frame.

Step 503: the time-based scheduler schedules the PDUs of the plurality of communication sessions.

Step 504: the PDUs of the plurality of communication sessions are sequentially transmitted to the power-based scheduler.

Step 505: the power-based scheduler schedules the plurality of PDUs.

Step 506: determine whether the total sum of the required power as the power-based scheduler schedules the PDUs exceeds the maximum power-strength of the base station. If not, go to Step 509.

Step 507: the power-based scheduler directly transmits the PDUs within the power range of the base station.

Step 508: the power-based scheduler sends back sequentially to the time-based scheduler the PDUs whose power amounts to the exceeding of the maximum power-strength of the base station. Then go back to Step 503.

Step 509, the PDUs are transmitted out directly.

The bandwidth adjuster can retain the bandwidth resources based on the desired quality of service for the communication session. Each corresponding priority value of a PDU can be assigned based on the desired quality of service. Further more, the PDUs of the communication session comprises a plurality of bits. The quality of service is further determined by an average service rate, a packet loss and error rate, and a packet delay bound. The priority value of the PDU with higher quality of service is larger than the priority value of the PDU with lower quality of service. The priority value of the PDU with higher quality of service means that the communication session of the PDU has a higher average service rate, a lower packet loss and error rate, and a lower packet delay bound. On the contrary, the priority value of the PDU with lower quality of service means that the communication session of the PDU has a lower average service rate, a higher packet loss and error rate, and a higher packet delay bound.

In the second embodiment of the present invention, the time-based scheduler comprises a plurality of receiving queues, a memory, and a temporary queue commonly used by the plurality of communication sessions. Each receiving queue receives and temporarily stores the plurality of PDUs that required to be transmitted by one or the plurality of communication sessions. The memory stores a corresponding maximum allowable number of each communication session. The maximum allowable number represents the maximum allowable number of the PDUs that the communication session is capable of processing in the predetermined time frame. The temporary queue temporarily stores the PDUs that are required to be transmitted to the power-based scheduler within allowable service rate.

At first, when the receiving queue receives the plurality of PDUs, if there is not any PDU in the receiving queue, the receiving queue assigns the priority value of the first PDU as the maximum allowable number, and further assigns the priority values of the remaining received PDUs in a descending order by one.

The scheduling unit schedules the priority of the PDUs based on the PS-classes assigned by each predetermined time frame. The scheduling unit transmits the PDUs with the positive priority values from the receiving queue to the temporary queue for further to be transmitted to the power-based scheduler. The PDUs with the positive priority values are allowed to be transmitted to the power-based scheduler within the predetermined service rate, and the PDUs with the non-positive priority values are received in advance by the power-based scheduler beyond the allowable service rate.

After that, for the PDUs of each communication session with the non-positive priority values, the scheduling unit updates their priority values by adding the additional maximum allowable number to their original priority values, and schedules the aforementioned PDUs with the received PDUs in the next predetermined time frame together. The scheduling unit assigns the priority values of the received PDUs in the next predetermined time frame in a descending order by one that starts from the succession to the minimum value of the updated priority values of the aforementioned PDUs.

The memory further stores a plurality of waiting bounds corresponding to the plurality of communication sessions. The waiting bound represents the longest time period that any PDU of the corresponding communication session is allowed to stay in the time-based scheduler and still remains valid. Each PDU received by the time-based scheduler has a corresponding aging time value representing the accumulated time period that the PDU has entered into the time-based scheduler.

Before each PDU is transmitted from the temporary queue to the power-based scheduler, determine whether the PDU is still valid by comparing the aging time value of the PDU with the corresponding waiting bound of the communication session. If the aging time value of the PDU is not larger than the corresponding waiting bound, the PDU is still valid and transmit it to the power-based scheduler. If the aging time value of the PDU is larger than the corresponding waiting bound, the PDU is either abandoned or transmitted to the power-based scheduler according to the previously defined data characters of communication sessions. In other words, determining to abandon or transmit compulsively to the power-based scheduler depends on the importance of the data that have been previously defined.

Figure 8:
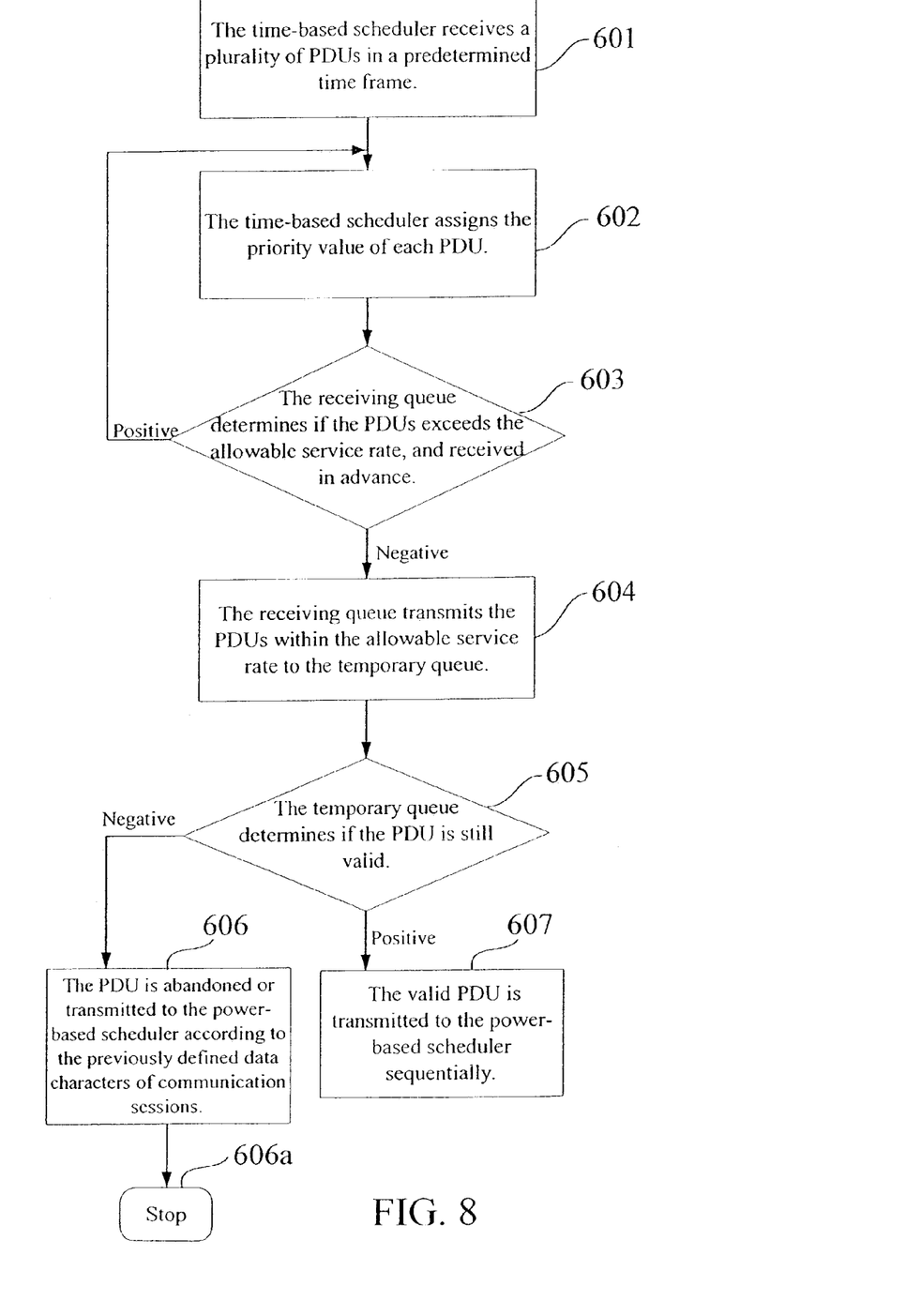
FIG. 8 is a flow chart for transmitting the PDUs from the time-based scheduler as shown in FIG. 7.

Please refer to FIG. 8. FIG. 8 is a flow chart for transmitting the PDUs from the time-based scheduler as shown in FIG. 7. In the time-based scheduler, transmit the PDUs can be described as the following steps:

Step 601: the time-based scheduler receives a plurality of PDUs in a predetermined time frame.

Step 602: the time-based scheduler assigns the priority values for each PDUs.

Step 603: the receiving queue determines whether the PDUs exceeds the allowable service rate so that arrive in advance. If yes, back to step 602.

Step 604: the receiving queue transmits the PDUs within the allowable service rate to the temporary queue.

Step 605: the temporary queue determines whether the PDUs are still valid by comparing the aging time value with the corresponding waiting bound. If the PDUs are valid, go to step 607; if the PDUs are invalid, go to step 606.

Step 606: according to the previously defined data characters of communication sessions to abandon or transmit the PDUs to the power-based scheduler.

Step 606a: stop.

Step 607: the valid PDUs are transmitted to the power-based scheduler sequentially.

About the above-mentioned time-based scheduler, the memory further stores a plurality of service weights and a plurality of service intervals of the PS-classes corresponding to the plurality of communication sessions. Each service weight is the ratio of the service rate of the corresponding communication session to the sum of all the service rates of the communication sessions in a PS-class of the corresponding communication session. Each service interval rate of the PS-class is a time interval when the time-based scheduler schedules the PS-class of the corresponding communication session again. In other words, each PS-class must be assigned at least once as the highest priority in the corresponding service interval of the PS-class. The waiting bound of the corresponding communication session is the ratio of the service interval of the PS-class to the service weight of the corresponding communication session.

The present invention is related to a method for scheduling and transmitting PDUs (Protocol Data Units) in the CDMA (Code Division Multiple Access) wireless communication system, especially related to a method which schedules and selectively transmits PDUs of the CDMA wireless communication system in the downlink direction by PCPS (Power-strength Classified Packet Scheduling) scheme. The invention provides a scheduler to receive the PDUs to be transmitted. The scheduler assigns the corresponding priority according to the received time and QoS (Quality of Service), and accumulates and schedules a plurality of PDUs in a predetermined time frame. The scheduler then transmits the plurality of PDUs according to the power-loading limit of the wireless communication system. The scheduling method for the communication session of the scheduling unit in accordance with the present invention efficiently utilities the limited power resources of a wireless communication system based on the real situation of communication sessions, and arranges the transmission of every communication session effectively to enhance the quality of service. The present invention can provide a higher average service rate, a lower packet loss and error rate, and a lower packet delay bound With the examples and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A scheduling unit in a wireless communication system, for sequentially receiving a plurality of Protocol Data Units (PDUs) in a plurality of communication sessions, accumulating and scheduling the plurality of PDUs during a predetermined time frame, and transmitting the plurality of PDUs based on a maximum power-strength of the wireless communication system, said scheduling unit comprising:
- a time-based scheduler for scheduling the plurality of accumulated PDUs during the predetermined time frame based on time sequence that the PDUs are received, and assigning a priority value to each corresponding PDU and transmitting the plurality of PDUs according to the priority values;
- a power-based scheduler for receiving and assigning power to the plurality of PDUs from the time-based scheduler, and scheduling and distributing the plurality of PDUs;

wherein when the power-based scheduler schedules the plurality of PDUs, if the total sum of the required power of the plurality of PDUs exceeds the maximum power-strength of the wireless communication system, the power-based scheduler sends back to the time-based scheduler the PDUs whose power amounts to the exceeding of the maximum power-strength of the wireless communication system according to the corresponding priority values of the PDUs, so that the wireless communication system transmits all at a time the remaining PDUs whose total power remains within the maximum power-strength.

2. The scheduling unit of claim 1, wherein each PDU in the communication session comprises a plurality of bits, and the priority value of the PDU is assigned based upon the desired Quality of Service of the communication session, and the Quality of Service is further determined by an average service rate, a packet loss and error rate, and a packet delay bound.

3. The scheduling unit of claim 1, wherein the corresponding priority value of each PDUs is assigned based on the time sequence that the PDU is received by the time-based scheduler, and the priority value of the earlier received PDU is larger than the priority value of the later received PDU.

4. The scheduling unit of claim 3, wherein when the power-based scheduler schedules the plurality of PDUs, if the total sum of the required power of the plurality of PDUs exceeds the maximum power-strength of the wireless communication system, the power-based scheduler sends back sequentially to the time-based scheduler the PDUs whose power amounts to the exceeding of the maximum power-strength of the wireless communication system according to the corresponding priority values of the PDUs in an order from small to large.

5. The scheduling unit of claim 1, wherein the time-based scheduler schedules the returned PDUs from the power-based scheduler with the PDUs received in the next predetermined time frame together.

6. The scheduling unit of claim 1, wherein the time-based scheduler raises the priority values of the returned PDUs from the power-based scheduler.

7. The scheduling unit of claim 1, wherein the communication-covered range of the wireless communication system is divided into a plurality of Power-Strength classes (PS-classes) according to the distance between the scheduling unit and originated positions of the plurality of PDUs.

8. The scheduling unit of claim 7, wherein the scheduling unit further comprises a bandwidth adjuster for classifying the PS-classes in the communication-covered range of the wireless communication system.

9. The scheduling unit of claim 8, wherein the bandwidth adjuster allots different bandwidth ratios to different PS classes, and the time-based scheduler sequentially processes the PDUs from the corresponding PS-classes according to the bandwidth ratios of the PS classes.

10. The scheduling unit of claim 9, wherein the plurality of PDUs are arranged and transmitted in the plurality of communication sessions, and received sequentially by the time-based scheduler, and the bandwidth adjuster allots the corresponding bandwidth ratios to the plurality of PS classes according to a sum of total service rates of the plural communication sessions.

11. The scheduling unit of claim 9, wherein the time-based scheduler comprises:
- a receiving queue for receiving and temporarily storing the plurality of PDUs for further processing;
- a memory for storing a maximum allowable number, representing the maximum number of the PDUs which the time-based scheduler is capable of processing in the predetermined time frame; and
- a controller for assigning the priority value of the plural PDUs temporarily stored in the receiving queue;

wherein when the receiving queue receives the plurality of PDUs, if there is not any PDU in the receiving queue, the controller assigns the priority value of the first received PDU as the maximum allowable number, and further assigns the priority values of the remaining received PDUs in a descending order.

12. The scheduling unit of claim 11, wherein the controller of the time-based scheduler further controls the transmission of the plurality of PDUs, and the time-based scheduler further comprises:
- a temporary queue for temporarily storing the PDUs which are to be transmitted to the power-based scheduler within allowable service rate;

wherein the controller transmits the PDUs having the positive priority values from the receiving queue to the temporary queue, for further to be transmitted to the power-based scheduler.

13. The scheduling unit of claim 12, wherein the PDUs having the positive priority values are allowed to be transmitted to the power-based scheduler within the predetermined service rate, and the PDUs having the non-positive priority values are received in advance by the power-based scheduler beyond the predetermined service rate.

14. The scheduling unit of claim 12, wherein as to the PDUs having the non-positive priority values, the controller updates their priority values by adding the additional maximum allowable number to their original priority values, and then schedules the aforementioned PDUs with the received PDUs in the next predetermined time frame together.

15. The scheduling unit of claim 14, wherein the controller assigns the priority values of the received PDUs in the next predetermined time frame in a descending order, which starts from the succession to the minimum value of the updated priority values of the aforementioned PDUs.

16. The scheduling unit of claim 12, wherein the memory further stores a plurality of waiting bounds corresponding to the plurality of communication sessions, the waiting bound representing the longest time period that any PDU of the corresponding communication session is allowed to stay in the time-based scheduler and still remains valid.

17. The scheduling unit of claim 16, wherein each PDU received by the time-based scheduler has a corresponding aging time value representing the accumulated time period that the PDU has entered into the scheduling unit.

18. The scheduling unit of claim 17, wherein the time-based scheduler further comprises a determination module, and before each PDU in a communication session is transmitted from the temporary queue to the power-based scheduler, the determination module determines if the PDU is still valid by comparing the aging time value of the PDU with the corresponding waiting bound of the communication session, and if the aging time value of the PDU is no larger than the corresponding waiting bound, the PDU is transmitted to the power-based scheduler.

19. The scheduling unit of claim 16, wherein the memory further stores a plurality of service weights and a plurality of service intervals of the PS classes corresponding to the plurality of communication sessions, each service weight being the ratio of the service rate of the corresponding communication session to the sum of all the service rates of the communication sessions in a PS class of the corresponding communication session, each service interval of the PS class being a time interval when the time-based scheduler schedules the PS class of the corresponding communication session again.

20. The scheduling unit of claim 19, wherein the waiting bound of the corresponding communication session is the ratio of the service interval of the PS-class to the service weight of the corresponding communication session.

21. A method for a scheduling unit in a wireless communication system to sequentially receive a plurality of Protocol Data Units (PDUs) in a plurality of communication sessions, each PDU being assigned corresponding power for transmission, the scheduling unit scheduling and transmitting the plurality of PDUs based on a maximum power-strength of the wireless communication system, the scheduling unit further comprising a time-based scheduler and a power-based scheduler, said method comprising the step of:
receiving and temporarily storing the plurality of external PDUs in the time-based scheduler during a predetermined time frame;
assigning priority values to the corresponding PDUs accumulated during the time frame based on time sequence that the PDUs are received;
transmitting the plurality of PDUs to the power-based scheduler so that the plurality of PDUs are scheduled based on the maximum power-strength of the wireless communication system;
comparing total sum of the required power of the plurality of PDUs to the maximum power-strength of the wireless communication system when the power-based scheduler schedules the plurality of PDUs, and if the total sum of the required power exceeds the maximum power-strength of the wireless communication system, the power-based scheduler sending back to the time-based scheduler the PDUs whose power amounts to the exceeding of the maximum power-strength of the wireless communication system according to the corresponding priority values of the PDUs; and
transmitting all at a time the remaining PDUs whose total power remains within the maximum power-strength.

22. The method of claim 21, wherein each PDU in the communication session comprises a plurality of bits, and the priority value of the PDU is assigned based upon the desired Quality of Service of the communication session, and the Quality of Service is further determined by an average service rate, a packet loss and error rate, and a packet delay bound.

23. The method of claim 21, wherein the corresponding priority value of each PDUs is assigned based on the time sequence that the PDU is received by the time-based scheduler, and the priority value of the earlier received PDU is larger than the priority value of the later received PDU.

24. The method of claim 23, wherein when the power-based scheduler schedules the plurality of PDUs, if the total sum of the required power of the plurality of PDUs exceeds the maximum power-strength of the wireless communication system, the power-based scheduler sends back sequentially to the time-based scheduler the PDUs whose power amounts to the exceeding of the maximum power-strength of the wireless communication system according to the corresponding priority values of the PDUs in an order from small to large.

25. The method of claim 22, wherein the time-based scheduler schedules the returned PDUs from the power-based scheduler with the PDUs received in the next predetermined time frame together.

26. The method of claim 22, wherein the time-based scheduler raises the priority values of the returned PDUs from the power-based scheduler.

27. The method of claim 22, wherein the communication-covered area of the wireless communication system is divided into a plurality of Power-Strength classes (PS-classes) according to the distance between the scheduling unit and originated positions of the plurality of PDUs.

28. The method of claim 27, wherein the scheduling unit further comprises a bandwidth adjuster for classifying the PS-classes in the communication-covered range of the wireless communication system.

29. The method of claim 28, wherein the bandwidth adjuster allots different bandwidth ratios to different PS classes, and the time-based scheduler sequentially processes the PDUs from the corresponding PS-classes according to the bandwidth ratios of the PS classes.

30. The method of claim 29, wherein the plurality of PDUs are arranged and transmitted in the plurality of communication sessions, and received sequentially by the time-based scheduler, and the bandwidth adjuster allots the corresponding bandwidth ratios to the plurality of PS classes according to a sum of total service rates of the plural communication sessions.

31. The method of claim 30, wherein the time-based scheduler comprising a receiving queue for receiving and temporarily storing the plurality of PDUs, a memory for storing a maximum allowable number, representing the maximum number of the PDUs which the time-based scheduler is capable of processing in the predetermined time frame, and wherein when the receiving queue receives the plurality of PDUs, if there is not any PDU in the receiving queue, the controller assigns the priority value of the first received PDU as the maximum allowable number, and further assigns the priority values of the remaining received PDUs in a descending order.

32. The method of claim 31, wherein the PDUs having the positive priority values are allowed to be transmitted to the power-based scheduler within the predetermined service rate, and the PDUs having the non-positive priority values are received in advance by the power-based scheduler beyond the predetermined service rate.

33. The method of claim 32, wherein the time-based scheduler further comprises a temporary queue for temporarily storing the PDUs which are to be transmitted to the power-based scheduler within allowable service rate, and transmits the PDUs having the positive priority values from the receiving queue to the temporary queue, for further to be transmitted to the power-based scheduler.

34. The method of claim 33, wherein as to the PDUs having the non-positive priority values, their priority values are updated by adding the additional maximum allowable number to their original priority values, and then the aforementioned PDUs are scheduled with the received PDUs in the next predetermined time frame together.

35. The method of claim 34, wherein the priority values of the received PDUs are assigned in the next predetermined time frame in a descending order, which starts from the succession to the minimum value of the updated priority values of the aforementioned PDUs.

36. The method of claim 33, wherein the memory further stores a plurality of waiting bounds corresponding to the plurality of communication sessions, the waiting bound representing the longest time period that any PDU of the corresponding communication session is allowed to stay in the time-based scheduler and still remains valid, and each PDU received by the time-based scheduler has a corresponding aging time value representing the accumulated time period that the PDU has entered into the scheduling unit, and if the aging time value of the PDU is no larger than the corresponding waiting bound, the PDU is transmitted to the power-based scheduler.

37. The method of claim 36, wherein the memory further stores a plurality of service weights and a plurality of service intervals of the PS classes corresponding to the plurality of communication sessions, each service weight being the ratio of the service rate of the corresponding communication session to the sum of all the service rates of the communication sessions in a PS class of the corresponding communication session, each service interval of the PS class being a time interval when the time-based scheduler schedules the PS class of the corresponding communication session again.

38. The method of claim 37, wherein the waiting bound of the corresponding communication session is the ratio of the service interval of the PS-class to the service weight of the corresponding communication session.

* * * * *